(12) United States Patent
Tolhurst

(10) Patent No.: US 8,027,672 B2
(45) Date of Patent: Sep. 27, 2011

(54) SYSTEM AND METHOD FOR DYNAMICALLY CONFIGURING WIRELESS NETWORK GEOGRAPHIC COVERAGE OR SERVICE LEVELS

(75) Inventor: William A. Tolhurst, Snohomish, WA (US)

(73) Assignee: Intellisist, Inc., Bellevue, WA (US)

( * ) Notice: Subject to any disclaimer, the term of this patent is extended or adjusted under 35 U.S.C. 154(b) by 902 days.

(21) Appl. No.: 11/929,518

(22) Filed: Oct. 30, 2007

(65) Prior Publication Data

US 2008/0214179 A1    Sep. 4, 2008

Related U.S. Application Data

(63) Continuation of application No. 11/751,420, filed on May 21, 2007, now Pat. No. 7,877,088, which is a continuation of application No. 10/440,023, filed on May 16, 2003, now Pat. No. 7,236,777.

(60) Provisional application No. 60/381,142, filed on May 16, 2002.

(51) Int. Cl.
*H04W 4/00*    (2009.01)

(52) U.S. Cl. ........................ 455/422.1; 455/423; 455/427

(58) Field of Classification Search .................. None
See application file for complete search history.

(56) References Cited

U.S. PATENT DOCUMENTS

| | | | |
|---|---|---|---|
| 4,052,568 A | 10/1977 | Jankowski | |
| 4,625,083 A | 11/1986 | Poikela | |
| 4,630,304 A | 12/1986 | Borth et al. | |
| 4,759,212 A | 7/1988 | Sawada et al. | |
| 4,827,500 A | 5/1989 | Binkerd et al. | |
| 4,876,710 A | 10/1989 | Reed et al. | |
| 4,878,170 A | 10/1989 | Zeevi | |
| 4,918,732 A | 4/1990 | Gerson et al. | |
| 5,029,233 A | 7/1991 | Metroka | |

(Continued)

FOREIGN PATENT DOCUMENTS

DE    19516647    11/1996

(Continued)

OTHER PUBLICATIONS

Zhao, Yilin, Efficient and reliable data transmission for cellular and GPS based mayday systems, Intelligent Transportation System, 1997. ITSC'97, IEEE Conference, pp. 555-559, Nov. 9-12, 1997, Boston, MA, USA, entire document.

(Continued)

*Primary Examiner* — Erika Gary
(74) *Attorney, Agent, or Firm* — Foster Pepper PLLC; Richard T. Black; P. G. Scott Born

(57) ABSTRACT

A system and a method for facilitating communication between a remote station and a service network are disclosed. A remote station is associated with a first communicator configured to communicate over a first communication network and a second communicator configured to communicate over a second communication network. A communication controller associated with the remote station and coupled with the first communicator and the second communicator is operable to transmit a first set of signals using the first communicator a second set of signals using the second communicator. A mobile network access point is directable to within a communication range of the second communicator of the remote station when the remote station is outside of an existing communication range of the second communication network and the first set of signals includes a resource request for the second communication network.

20 Claims, 5 Drawing Sheets

U.S. PATENT DOCUMENTS

| | | | |
|---|---|---|---|
| 5,062,132 A | 10/1991 | Yasuda et al. | |
| 5,168,277 A | 12/1992 | LaPinta et al. | |
| 5,259,018 A | 11/1993 | Grimmett et al. | |
| 5,263,181 A | 11/1993 | Reed | |
| 5,357,513 A | 10/1994 | Kay et al. | |
| 5,371,901 A | 12/1994 | Reed et al. | |
| 5,414,624 A | 5/1995 | Anthonyson | |
| 5,539,810 A | 7/1996 | Kennedy, III et al. | |
| 5,564,796 A | 10/1996 | Saito et al. | |
| 5,570,087 A | 10/1996 | Lemelson | |
| 5,649,055 A | 7/1997 | Gupta et al. | |
| 5,668,854 A | 9/1997 | Minakami et al. | |
| 5,712,788 A | 1/1998 | Liaw et al. | |
| 5,719,921 A | 2/1998 | Vysotsky et al. | |
| 5,729,531 A | 3/1998 | Raith et al. | |
| 5,732,074 A | 3/1998 | Spaur et al. | |
| 5,749,072 A | 5/1998 | Mazurkiewicz | |
| 5,761,638 A | 6/1998 | Knittle et al. | |
| 5,777,580 A | 7/1998 | Janky et al. | |
| 5,805,079 A | 9/1998 | Lemelson | |
| 5,835,868 A | 11/1998 | McElroy et al. | |
| 5,835,881 A | 11/1998 | Trovato et al. | |
| 5,867,780 A | 2/1999 | Malackowski et al. | |
| 5,870,667 A | 2/1999 | Globuschutz | |
| 5,877,723 A | 3/1999 | Fan | |
| 5,937,355 A | 8/1999 | Joong et al. | |
| 5,940,481 A | 8/1999 | Zeitman | |
| 5,940,503 A | 8/1999 | Palett et al. | |
| 5,943,429 A | 8/1999 | Handel | |
| 5,945,985 A | 8/1999 | Babin et al. | |
| 5,946,343 A | 8/1999 | Schotz et al. | |
| 5,956,683 A | 9/1999 | Jacobs et al. | |
| 5,960,399 A | 9/1999 | Barclay et al. | |
| 5,963,861 A | 10/1999 | Hanson | |
| 6,006,148 A | 12/1999 | Strong | |
| 6,011,786 A | 1/2000 | Dent | |
| 6,019,475 A | 2/2000 | Lynam et al. | |
| 6,037,880 A | 3/2000 | Manion | |
| 6,044,266 A | 3/2000 | Kato | |
| 6,052,604 A | 4/2000 | Bishop, Jr. et al. | |
| 6,085,428 A | 7/2000 | Casby et al. | |
| 6,105,060 A | 8/2000 | Rothblatt | |
| 6,111,539 A | 8/2000 | Mannings et al. | |
| 6,111,964 A | 8/2000 | Ishibashi | |
| 6,125,284 A | 9/2000 | Moore et al. | |
| 6,128,482 A | 10/2000 | Nixon et al. | |
| 6,151,539 A | 11/2000 | Bergholz et al. | |
| 6,154,658 A | 11/2000 | Caci | |
| 6,154,662 A | 11/2000 | Norton et al. | |
| 6,157,317 A | 12/2000 | Walker | |
| 6,161,071 A | 12/2000 | Shuman et al. | |
| 6,163,752 A | 12/2000 | Sievers et al. | |
| 6,199,013 B1 | 3/2001 | O'Shea | |
| 6,202,008 B1 | 3/2001 | Beckert et al. | |
| 6,206,283 B1 | 3/2001 | Bansal et al. | |
| 6,208,927 B1 | 3/2001 | Mine et al. | |
| 6,212,473 B1 | 4/2001 | Stefan et al. | |
| 6,233,452 B1 | 5/2001 | Nishino | |
| 6,240,365 B1 | 5/2001 | Bunn | |
| 6,243,003 B1 | 6/2001 | DeLine et al. | |
| 6,249,233 B1 | 6/2001 | Rosenberg et al. | |
| 6,275,231 B1 | 8/2001 | Obradovich | |
| 6,279,946 B1 | 8/2001 | Johnson et al. | |
| 6,292,781 B1 | 9/2001 | Urs et al. | |
| 6,308,126 B2 | 10/2001 | Yokoyama et al. | |
| 6,317,684 B1 | 11/2001 | Roeseler et al. | |
| 6,296,280 B1 | 12/2001 | Strube et al. | |
| 6,334,089 B2 | 12/2001 | Hessing | |
| 6,336,090 B1 | 1/2002 | Chou et al. | |
| 6,344,806 B1 | 2/2002 | Katz | |
| 6,349,329 B1 | 2/2002 | Mackintosh et al. | |
| 6,351,698 B1 | 2/2002 | Kubota et al. | |
| 6,353,785 B1 | 3/2002 | Shuman et al. | |
| 6,363,324 B1 | 3/2002 | Hildebrant | |
| 6,370,237 B1 | 4/2002 | Schier | |
| 6,370,506 B1 | 4/2002 | Ahluwalia | |
| 6,374,214 B1 | 4/2002 | Friedland et al. | |
| 6,377,210 B1 | 4/2002 | Moore | |
| 6,389,332 B1 | 5/2002 | Hess et al. | |
| 6,389,389 B1 | 5/2002 | Meunier et al. | |
| 6,393,403 B1 | 5/2002 | Majaniemi | |
| 6,405,027 B1 | 6/2002 | Bell | |
| 6,408,272 B1 | 6/2002 | White et al. | |
| 6,421,607 B1 | 7/2002 | Gee et al. | |
| 6,441,790 B1 | 8/2002 | Forrester et al. | |
| 6,453,020 B1 | 9/2002 | Hughes et al. | |
| 6,481,622 B2 | 11/2002 | Hjelmvik | |
| 6,484,174 B1 | 11/2002 | Wall et al. | |
| 6,487,402 B1 | 11/2002 | Faus et al. | |
| 6,487,494 B2 | 11/2002 | Odinak et al. | |
| 6,496,776 B1 | 12/2002 | Blumberg et al. | |
| 6,496,799 B1 | 12/2002 | Pickering | |
| 6,516,466 B1 | 2/2003 | Jackson | |
| 6,519,329 B1 | 2/2003 | Hjelmvik | |
| 6,526,335 B1 | 2/2003 | Treyz et al. | |
| 6,526,486 B2 | 2/2003 | Theimer | |
| 6,615,381 B1 | 9/2003 | Fukuda et al. | |
| 6,628,928 B1 | 9/2003 | Crosby et al. | |
| 6,671,617 B2 | 12/2003 | Odinak et al. | |
| 6,765,497 B2 | 7/2004 | Ablay et al. | |
| 6,779,196 B1 | 8/2004 | Igbinadolor | |
| 6,810,323 B1 | 10/2004 | Bullock et al. | |
| 6,895,238 B2 | 5/2005 | Newell et al. | |
| 7,236,777 B2 * | 6/2007 | Tolhurst | 455/422.1 |
| 7,266,379 B2 * | 9/2007 | Blight et al. | 455/456.3 |
| 2001/0010500 A1 | 8/2001 | Lundin et al. | |
| 2001/0014863 A1 | 8/2001 | Williams, III | |
| 2001/0016500 A1 | 8/2001 | Son et al. | |
| 2001/0020211 A1 | 9/2001 | Takayama et al. | |
| 2001/0021646 A1 | 9/2001 | Antonucci et al. | |
| 2001/0030598 A1 | 10/2001 | Deline et al. | |
| 2001/0033643 A1 | 10/2001 | Mulvey et al. | |
| 2002/0028655 A1 | 3/2002 | Rosener et al. | |
| 2002/0065037 A1 | 5/2002 | Messina et al. | |
| 2002/0068543 A1 | 6/2002 | Shah | |
| 2002/0069071 A1 | 6/2002 | Knockeart et al. | |
| 2002/0075168 A1 | 6/2002 | Ablay et al. | |
| 2002/0103639 A1 | 8/2002 | Chang et al. | |
| 2002/0111172 A1 | 8/2002 | DeWolf et al. | |
| 2002/0113203 A1 | 8/2002 | Heslin et al. | |
| 2002/0140545 A1 | 10/2002 | Nietupski et al. | |
| 2002/0142803 A1 | 10/2002 | Yamamoto | |
| 2002/0143999 A1 | 10/2002 | Yamagami | |
| 2002/0158753 A1 | 10/2002 | DeLine et al. | |
| 2002/0173347 A1 | 11/2002 | Kinnunen | |
| 2003/0169160 A1 | 9/2003 | Rodriguez et al. | |
| 2004/0110515 A1 | 6/2004 | Blumberg et al. | |
| 2005/0028208 A1 | 2/2005 | Ellis et al. | |

FOREIGN PATENT DOCUMENTS

| | | |
|---|---|---|
| EP | 0461888 | 3/1995 |
| EP | 0829704 | 3/1998 |
| FR | 02762906 | 11/1998 |
| JP | 04219783 | 8/1992 |
| JP | 07159186 | 6/1995 |
| JP | 08044996 | 2/1996 |
| WO | WO9909374 | 2/1999 |
| WO | WO03098946 | 11/2003 |

OTHER PUBLICATIONS

Nusser, et al., Bluetooth-based wireless connectivity in an automatic environment, Vehicular Technology Conference, 2000. IEEE-VTS, Fall VTC 200. 52nd, pp. 2541-2548, vol. 6, Sep. 24-28, 2000, Boston, MA, USA, entire document.

Stirling, A., Mobile multimedia platforms, Vehicular Technology Conference, 2000. IEEE-VTS Fall VTC 200. 52nd, pp. 2541-2548, vol. 6, Sep. 24-28, 2000, Boston, MA, USA, entire document.

Jameel, et al., Interest multimedia on wheels: connecting cars to cyberspace, Intelligent Transportation System, 1997. ITSC'97, IEEE Conference, pp. 637-642, Nov. 9-12, 1997, Boston, MA, USA. entire document.

Kushner, et al., Effects of subtractive-type speech enhancement/ noise reduction algorithms on parameter estimation for improved recognition and coding in high noise environments, vol. 1, ICASSP-89, May 23-26, 1989, pp. 211-221.

Boll, Steven F., Suppression of acoustic noise in speech using spectral subtraction, IEEE Transaction on ASSP, vol. ASSP-2 No. 2, Apr. 1979.

Un and Choi, Improving LPC analysis of noisy speech by auto correlation subtraction method, ICASSP 81 Proceedings, Mar. 30-Apr. 1, 1981, pp. 1082-1085.

* cited by examiner

US 8,027,672 B2

SYSTEM AND METHOD FOR DYNAMICALLY CONFIGURING WIRELESS NETWORK GEOGRAPHIC COVERAGE OR SERVICE LEVELS

PRIORITY CLAIM

This application is a continuation of U.S. application Ser. No. 11/751,420 filed May 21, 2007 now U.S. Pat. No. 7,877,088 which is a continuation of U.S. patent application Ser. No. 10/440,023 filed May 16, 2003 now U.S. Pat. No. 7,236,777 which claims the benefit of U.S. Provisional Application No. 60/381,142, filed May 16, 2002.

FIELD OF THE INVENTION

This invention relates generally to wireless communication and, more specifically, to extending coverage and bandwidth wireless communication service.

BACKGROUND OF THE INVENTION

The following application is incorporated by reference as if fully set forth herein: U.S. application Ser. No. 11/751,420 filed May 21, 2007.

Wireless communication grows in importance daily. Cellular telephones have become standard accessories for adults and children. Coffee shops and other public venues are equipped with "wi-fi" connections allowing visitors to access the Internet with wireless-enabled notebook computers, handheld computers, and portable digital assistants. Even automobiles are equipped with wireless communication devices that allow drivers to call for roadside assistance or, if an owner should lock himself or herself out of the car, to telephone a service operator to remotely unlock the car's doors.

Not surprisingly, the proliferation of wireless communication inspires both increased capabilities and commensurate increased demands for wireless communication bandwidths. To name one example, recently cellular telephone vendors have begun to market wireless interfaces that allow for capture of still photographs, short movies, and voice narration. If the popularity of these devices grows as the cellular telephone companies expect them to grow, just as the proliferation of cellular telephones has consumed available telephone exchanges and area codes, proliferation of multifunctional devices will consume available cellular bandwidth.

Unfortunately, just as cellular telephone companies have devised products such as "picture phones," other technologies doubtlessly will be devised which will require even more wireless bandwidth. This is a costly problem. Once capacity within allocated frequency ranges has been exhausted, additional parallel networks will have to be created in existing frequency ranges. Wireless network base station transceivers provide coverage across a limited geographic area. Thus, coverage is extendable only by deploying additional base station transceivers, antennas, and other facilities in the same way that such infrastructure has been built to create the geographical coverage of existing wireless networks. Without expansion of wireless network infrastructure, wireless communication device users may not be able to fully benefit from wireless communication devices they use.

For example, FIG. 1 depicts a situation 100 concerning an automobile 110 that has suffered mechanical failure. The automobile 110 is equipped with two different wireless communication transceivers. A first transceiver is a conventional wireless telephone configured to communicate with a first communication network 120. The automobile 110 is within a communication range 130 of the first communication network 120, thus an operator of the automobile 110 is able to telephone for assistance.

The automobile 110 also is equipped with a second transceiver using a proprietary communication system which allows the automobile 110 itself and/or its operator to communicate with an automobile service facility through a second communication network 140. Potentially, data communication between a computer system associated with the automobile 110 might even allow for some faults to be corrected remotely. Alternatively, the fault might be able to be remotely diagnosable through the second communication network 140 or, at a minimum, the operators of the second communication network 140 network likely would be better prepared to arrange to dispatch a tow truck or other service vehicles. Unfortunately, as can be seen in the situation 100 depicted in FIG. 1, the automobile 110 is outside of the communication range 150 of the second communication network 140. As a result, any assistance that might be offered through the second communication network 140 is not available to the operator of the automobile 110. Thus, the operator of the automobile 110 is left to determine his or her location and to try to find the telephone number of a towing service. This can be a troubling ordeal, particularly if the operator has driven the automobile 110 to an unfamiliar location.

Thus, there is an unmet need in the art for expanding wireless communication coverage capabilities to support the bandwidth and/or geographical coverage needed to support desired wireless functionality.

SUMMARY OF THE INVENTION

Embodiments of the present invention provide an "as needed" extension of wireless network geographic coverage, service access/fulfillment or service level (e.g., available bandwidth) dynamically in response to a request received from a wireless device. As part of this request, the wireless device provides information identifying its location and/or a set of signals describing the basis of the request for additional communication services.

More specifically, according to an embodiment of the present invention, a remote station is associated with a first communicator configured to communicate over a first communication network and a second communicator configured to communicate over a second communication network. A communication controller associated with the remote station and coupled with the first communicator and the second communicator is operable to transmit a first set of signals using the first communicator and a second set of signals using the second communicator. A mobile network access point is directable to within a communication range of the second communicator of the remote station when the remote station is outside of an existing communication range of the second communication network and the first set of signals includes a resource request for the second communication network.

In accordance with further aspects of the present invention, the system includes a communication controller configured to be coupled with at least one of the first communicator and the second communicator for receiving inputs concerning a status of the remote station and reporting that status using at least one of the first communicator and the second communicator. The communication controller is configured to be coupled with sensing equipment for gathering information about the status of the remote station. The sensing equipment includes at least one of a telephone interface configured to provide audio communication with a remote station operator, a global positioning system for determining a geographical position of the remote station, a monitoring device for generating telemetry reflecting conditions at the remote station, and an alert key for signaling an emergency situation at the remote station. According to an embodiment of the present invention, the first set of signals includes at least one of a location of the remote station, a request for communication with a second communication network, and an event code signifying a condition at the remote station for which transmitting the second set of signals is desired. The second set of signals includes the telemetry reflecting the conditions at the remote station.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

By way of overview of embodiments of the present invention, a remote station is associated with a first communicator configured to communicate over a first communication network and a second communicator configured to communicate over a second communication network. A communication controller is associated with the remote station and coupled with the first communicator and the second communicator. The communication controller is operable to transmit a first set of signals using the first communicator a second set of signals using the second communicator. A mobile network access point is directable to within a communication range of the second communicator of the remote station when the remote station is outside of an existing communication range of the second communication network and the first set of signals includes a resource request for the second communication network.

Figure 2:
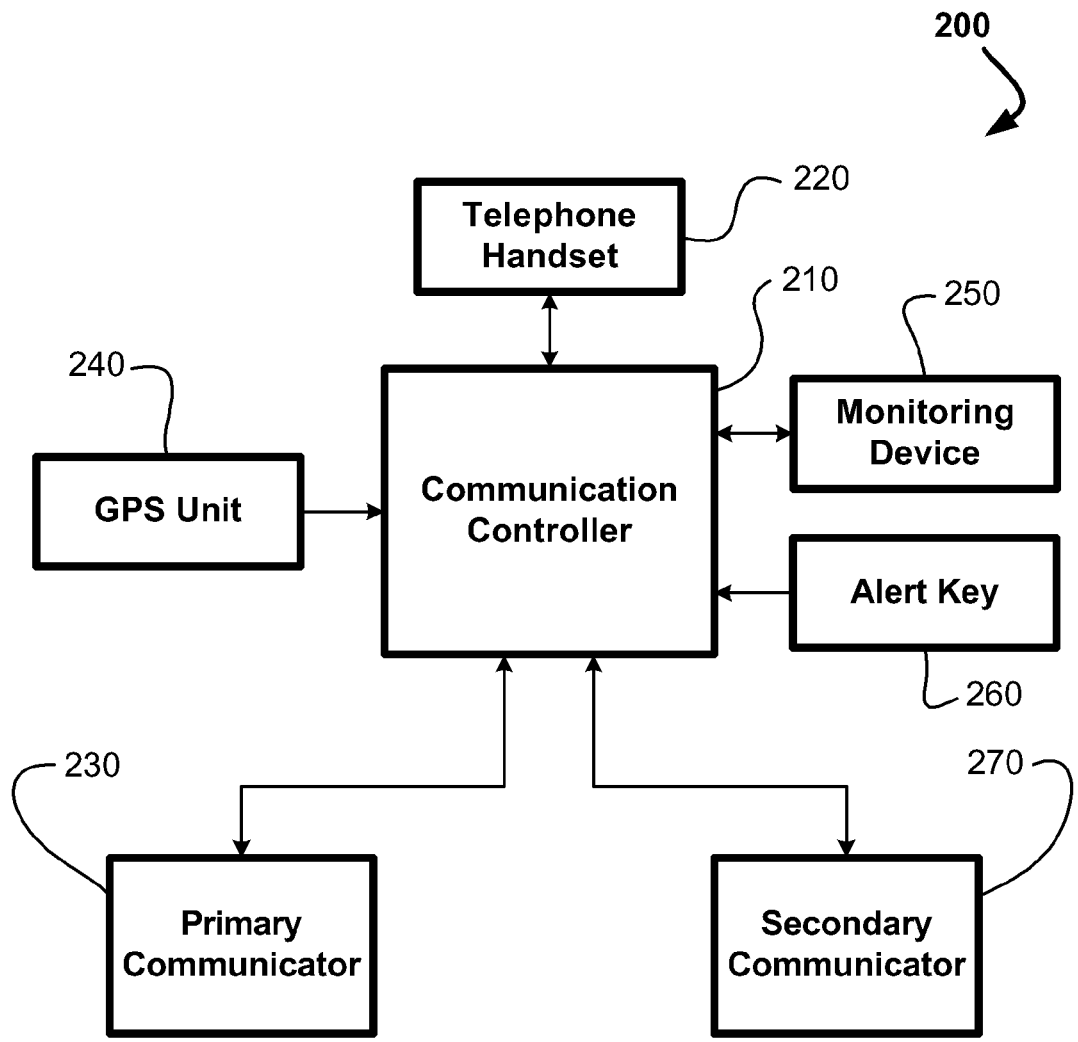
FIG. 2 is a block diagram of a communication system used by a remote station according to an embodiment of the present invention.

FIG. 2 is a block diagram of a communication system 200 used by a remote station according to an embodiment of the present invention. At a core of the communication system 200 is a communication controller 210 which controls the receipt and transmission of information as will be further described below. Coupled with the communication controller 210 is a telephone interface 220, such as a telephone handset, which provides a user of the remote station with verbal communication capabilities. The telephone interface 220 accesses a primary communicator 230 through the communication controller 210. The communication system 200, through the configuration shown in FIG. 2, provides for the possibility of typical wireless cellular telephone communication between a user at the remote station and individuals or services with telephone access.

Unlike a typical wireless telephone system, however, the communication controller 210 is also in communication with other devices. The communication controller 210 receives input from a global positioning system unit (GPS) 240. The GPS unit 240, using known technology, is operable to determine the geographic position of the remote station and provide that information to the communication controller 210. The GPS unit 240 can be configured to determine and provide such information continually, at regular intervals, or upon demand based on a command received from the communication controller.

The communication controller 210 also receives information from a monitoring device 250. The monitoring device 250 can be in one of any number of forms depending on the nature of the remote station. For example, if the remote station is an automobile, the monitoring device 250 may be an automobile monitoring computer. The automobile monitoring computer can be configured to monitor the operation of the automobile's systems. If the automobile monitoring system detects that a fault is about to occur or has occurred, the automobile monitoring computer can relay that information to the communication controller 210. Alternatively, if the remote station is an individual wearing or carrying the communication system 200, the monitoring device 250 can be a physiological monitoring device, such as a heart monitor, blood pressure monitor, respiration monitor, blood glucose monitor, another monitoring device or some combination of such devices. These physiological monitoring devices can provide the individual with continual, regular, or as-requested updates as to his or her physical condition, and the communication system 200 can relay that update to medical personnel. Similarly, if the physiological monitoring devices should detect an unusual or alarming situation, the physiological monitoring devices can alert the individual to that situation, or can alert medical personnel to that situation using the communication system 200.

The communication controller 210 is also coupled with an alert key 260. The alert key 260 may be in the nature of a "panic button" familiar to users of home burglar/fire alarms, automobile alarms, and emergency medical alert devices. Pressing the alert key 260 can direct the communication controller 210 to transmit an emergency signal to relevant emergency personnel. For example, if the communication system 200 is deployed in an automobile, pressing of the alert key 260 can connect the user with a service operator from whom specific assistance can be requested. For another example, if the communication system 200 is worn or carried by an individual, pressing the alert key may open a direct line to an emergency medical operator to send emergency medical assistance to the individual.

The communication controller 210 effects remote communication using the primary communicator 230 and a secondary communicator 270. Both the primary communicator 230 and the secondary communicator 270 preferably are transceivers capable of two-way communication. To provide conventional wireless telephone service as previously described, at least one of the primary communicator 230 and the secondary communicator 270 must provide bidirectional communication. In one presently preferred embodiment, the primary communicator 230 is used to support conventional wireless communication, while the secondary communicator 270 is used for other communication. In the presently preferred embodiment, the secondary communicator 270 is a transceiver capable of bidirectional communication, although the secondary communicator 270 could be solely a transmitter to transmit telemetry over a second network.

Figure 1:
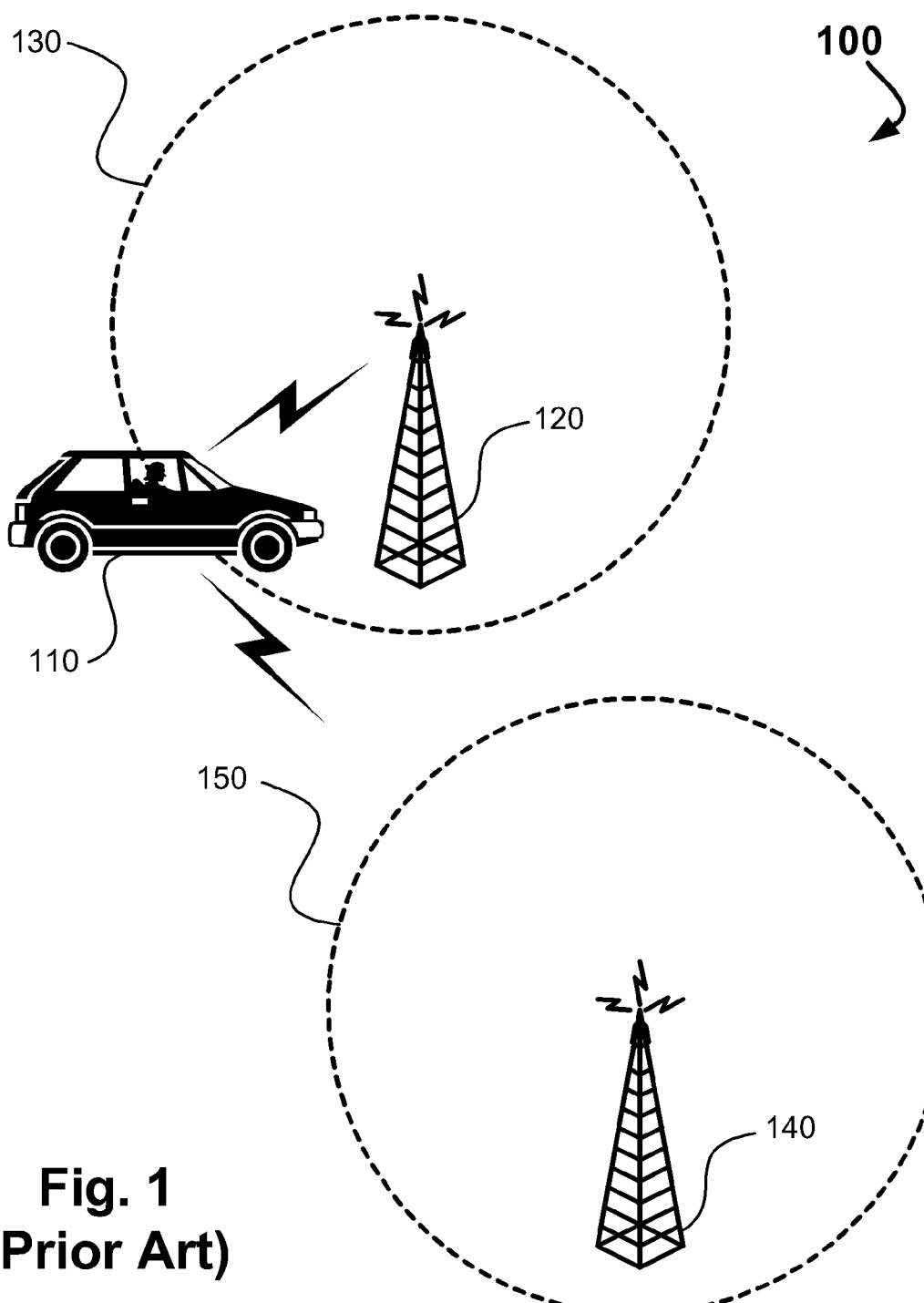
FIG. 1 is a prior art depiction of a remote station in communication with a first communication network but out of range and unable to communicate with a second communication network.
Figure 3:
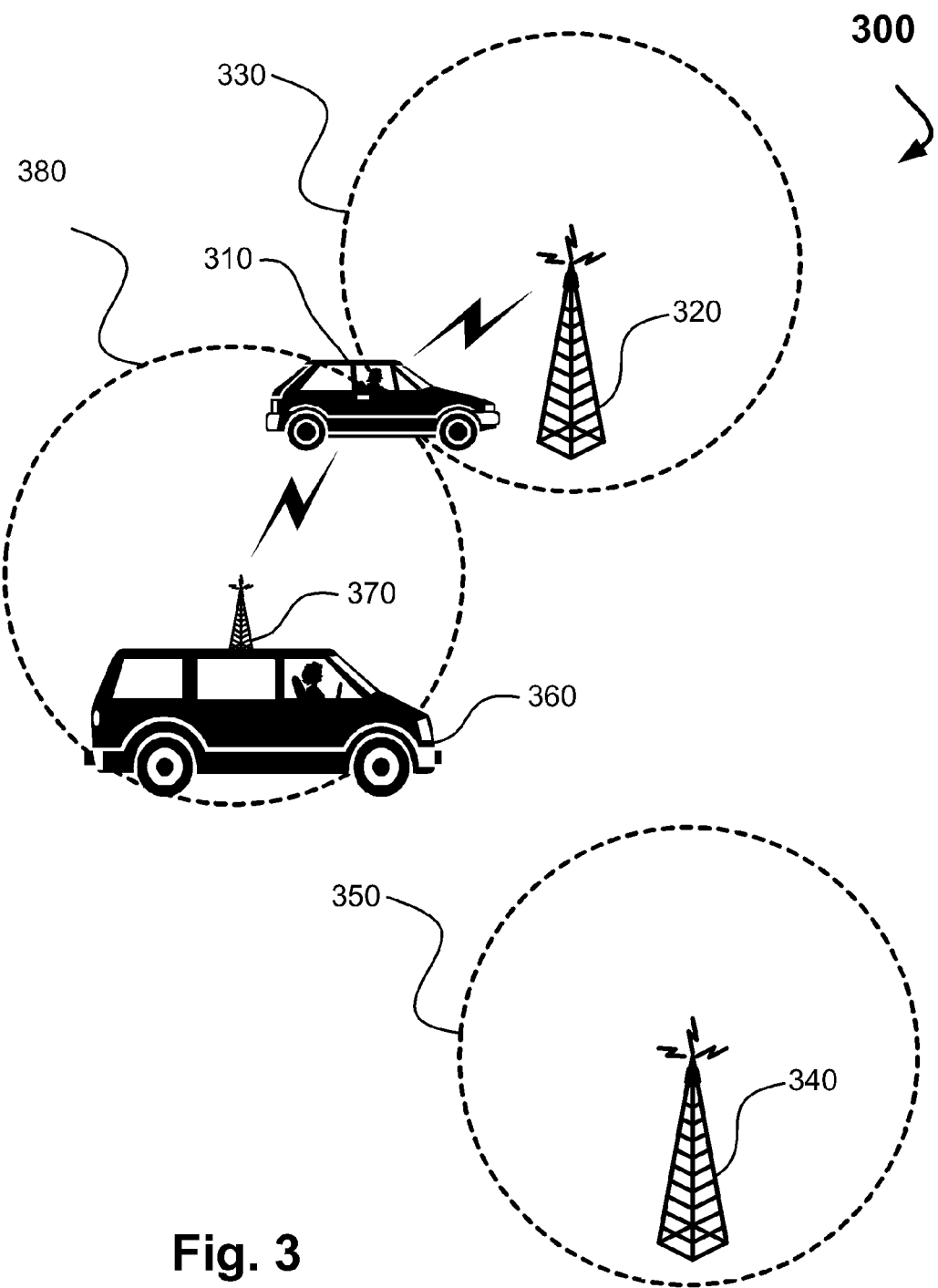
FIG. 3 is a remote station in communication with a first communication network and a mobile access point enabling communication with a second communication network.

FIG. 3 illustrates a situation 300 showing how the communication system 200 (FIG. 2) can be used to facilitate greater communication with a remote station. In many respects, the situation 300 is similar to that of the conventional situation 100 (FIG. 1). As shown in FIG. 3, the remote station is associated with an automobile 310. Again, for purposes of this illustration, it is presumed that the automobile 310 has suffered mechanical failure. The automobile 310 is equipped with a communication system 200 having both a primary communicator 230 and a secondary communicator 270. The primary communicator is configured to communicate with a first communication network 320. The automobile 310 is within communication range 330 of the first communication network 230. Thus, an operator of the automobile 310 is able to call for assistance via the primary communicator 230 and the first communication network 320. Because of bandwidth limitations or protocol incompatibilities, the automobile 310 cannot communicate additional information over the first network 320. Also unfortunately, as in the conventional situation 100, the automobile 310 is outside of communication range 350 of the second network 340. It will be appreciated that, although the communication ranges 330 and 350 are depicted in FIG. 3 as being associated with the first communication network 320 and the second communication network 340, the communication range could be depicted as being associated with the automobile 310 relative to the first communication network 320 and the second communication network 340.

However, unlike the first situation 100 (FIG. 1), in the situation 300 using an embodiment of the present invention the second communication network can be extended to facilitate communication with the automobile 310. When a service request is made from the automobile 310 via the primary communicator 230 over the first network 320, GPS data generated by the GPS unit 240 and basic fault information received from the monitoring device 250 is included in the transmission. In this case, the monitoring device 250 can be presumed to be an automobile monitoring computer. Having received the basic fault information from the call placed using the first communicator 230, the service network determines whether additional communication with the second communicator 270 will assist in the resolving the problem. If additional telemetry from the second communicator will aid in resolution of the problem, the service network dispatches a service vehicle 360 equipped with a mobile access point 370 toward the automobile 310 to effect communication with the secondary communicator 270 (FIG. 2). Once the mobile access point 370 of the service vehicle 360 is in communication range 380 with the automobile 310, additional data and/or telemetry can be received from the communication system 200 associated with the automobile 310. Receiving this telemetry at a distance from the automobile 310 can allow for further diagnostics to be performed on the automobile. Alternatively or additionally, if the automobile 310 is still drivable, travel instructions directing how the automobile 310 can travel to within the communication range 350 of the second communication network 340 or the communication range 380 of the mobile access point 370 can be transmitted via the first communicator 230 to facilitate establishing communication between the automobile 310 via the second communication network 340 or the mobile access point 370.

Having communication with the automobile 310 provides a number of possible advantages. To name one possible advantage, if the problem can be corrected with a software adjustment, the software adjustment can be effected by transmission from the mobile access point 370 while neither the driver of the automobile 310 nor the driver of the service vehicle 360 loses time while waiting for the service vehicle 360 to physically reach the automobile. Also, additional diagnostics made possible by the telemetry permitted through advanced communication between the automobile 310 and the service vehicle 360 may indicate that parts or services are needed to rectify the situation that are not available from the service vehicle. In such a case, the appropriate parts are services can be sought and/or dispatched before the service vehicle 360 reaches the automobile. At a minimum, time can be saved if the telemetry allows the problem to be diagnosed without having to wait for the service vehicle 360 to actually reach the automobile to commence the diagnostic process.

Advantages of a system permitting for flexible deployment and/or extension of such a communication network extend to many contexts. To name one example, when the remote station is worn or carried by an individual and the monitoring device 250 (FIG. 2) is a heart monitor, lives can be saved. If medical technicians or supervisory medical technicians can receive additional information about a patient who has suffered a cardiac episode before arriving on the scene, how the patient might be treated can be planned in advance and specialized services can be dispatched as desired. Also, if the remote station is a news crew desiring more bandwidth to relay information about a breaking story, a wireless access point 370 dispatched to within communication range of the remote station can allow for the information to be broadcast over a media outlet or, at least, be broadcast sooner.

Similar applications can aid rescue workers on land and at sea, law enforcement officers, military personnel, and others who can benefit from an on-demand/as needed geographical extension of a network. For example, a primary communicator 230 (FIG. 2) might be a satellite telephone incapable of providing sufficient bandwidth for appropriate telemetry. Dispatch of a mobile access point 370 can provide the desired coverage in that area. Likewise, a bandwidth increase within an area where insufficient bandwidth is currently available can be useful. For example, in the event of a natural disaster, relief workers might need more wireless bandwidth than is supported by the infrastructure of the affected area. Dispatch of a mobile access point 370 can provide the bandwidth desired in the affected area. Applications such as these and others can benefit from expandable wireless networking.

Figure 4:
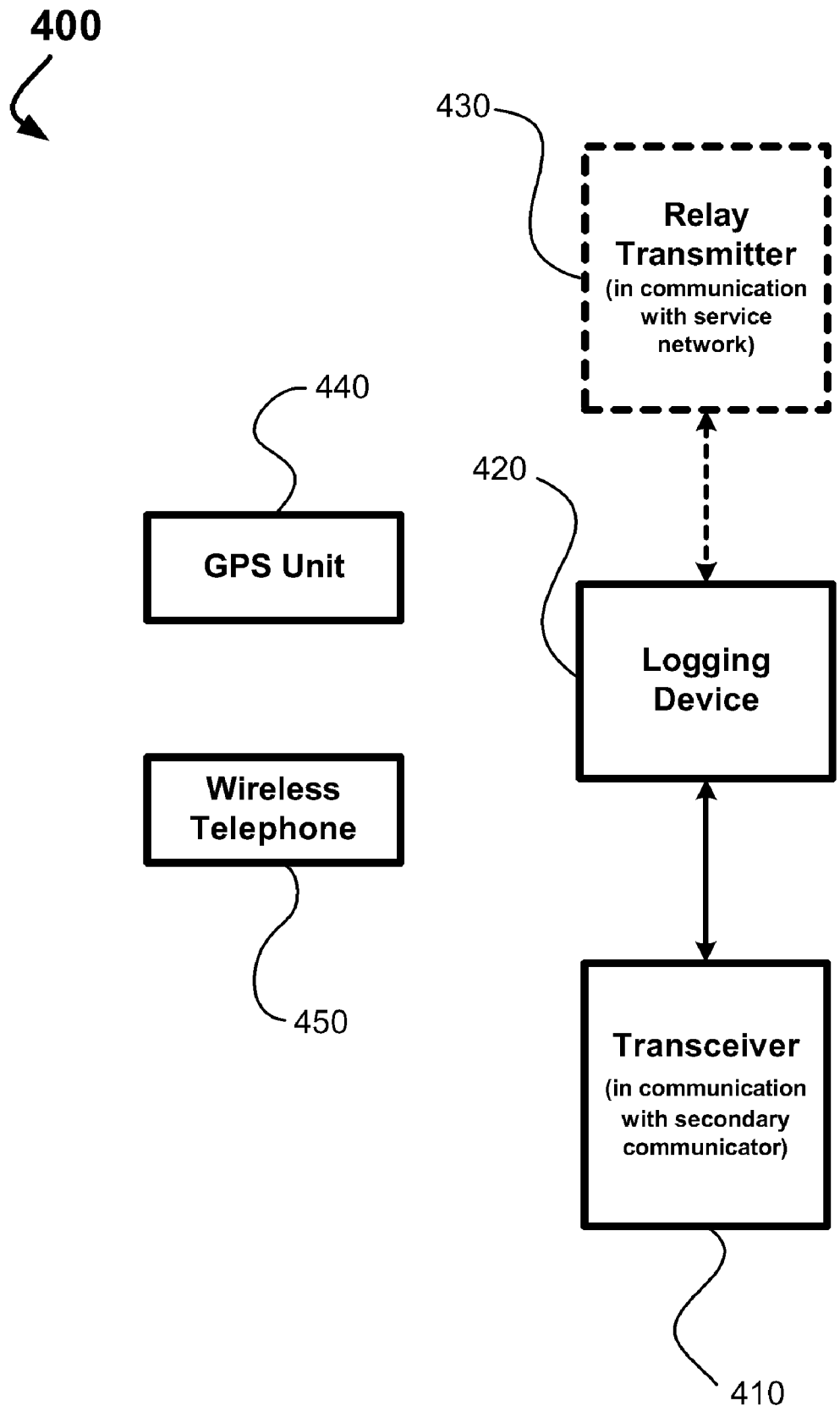
FIG. 4 is a block diagram of communication systems used by a mobile access point according to an embodiment of the present invention.

FIG. 4 is a block diagram of a mobile access point 400 according to an embodiment of the present invention that might be associated with a service vehicle 360 (FIG. 3) or other movable carrier. The wireless access point 400 includes a transceiver 410 with which the mobile access point 400 can communicate with a remote station 310 (FIG. 3) upon reaching communication range of the second communicator 270 (FIG. 2). The transceiver 410 and the second communicator 270 could provide communications over an alternative cellular telephone band. Alternatively, the transceiver 410 could be a wireless 802.011 network protocol transceiver, or another form of wireless transceiver configured to wirelessly communicate with the second communicator 270. Coupled with the wireless transceiver 410 is a suitable logging device 420 for recording the telemetry or other communication received via the wireless transceiver 410 from a remote station. The logging device 420 can then rebroadcast data received from the wireless transceiver 410 to a support network using a relay transmitter 430. The relay transmitter 430 suitably is a proprietary band transmitter or another device to permit relay communication to a network. It will be appreciated that, instead of rebroadcasting communication received from the wireless transceiver 410, communication received might be diagnosed by a suitably equipped logging device 420. In either case, whether data that can benefit the remote station is received via the relay transmitter 430 or generated locally, data that can assist the remote station is transmitted to the remote station via the wireless transceiver 410.

In addition, the mobile access point 400 preferably is equipped with a GPS unit 440 for determining a present position of the mobile access point 400 to aid in locating the remote station that is sought. Similarly, the mobile access point 400 is equipped with a wireless telephone 450 for communicating with a dispatcher, the remote station, or others who can assist with resolving issues arising at the remote station. Because the GPS unit 440 and wireless telephone 450 are not involved in transmitting location information, service requests, or other data as transmitted by the remote station, the GPS unit 440 and the wireless telephone 450 can be separate from the transceiver 410, logging device 420, and relay station.

Figure 5:
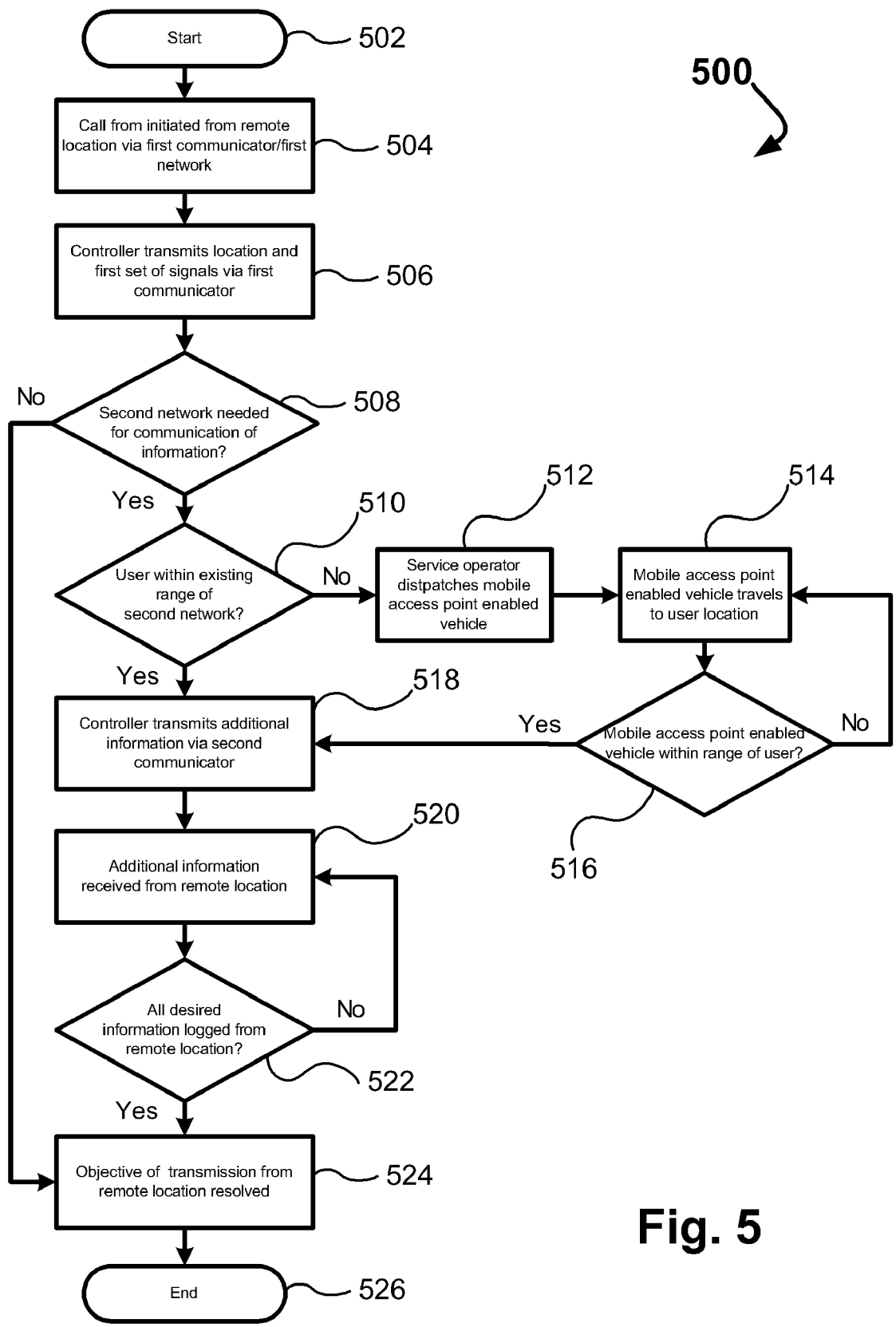
FIG. 5 is a flowchart of a method using an embodiment of the present invention.

FIG. 5 is a flowchart of a routine 500 according to an embodiment of the present invention. The routine 500 begins at a block 502. At a block 504, a call is initiated concerning a situation at the remote station via the first communicator/first network. At a block 506, the communication controller 210 (FIG. 2) causes a first set of signals including location information and other information regarding the situation at the remote station to be transmitted via the first communicator 230 (FIG. 2) over the first network 320 (FIG. 3). At a decision block 508, it is determined if use of the second network is desired to facilitate transmission of additional information from the remote station. If not, the routine 500 skips ahead to a block 524 for resolution of the objective of the original transmission initiated at the block 504. On the other hand, if it is determined at the decision block 508 that the second network should be used to facilitate further communication from the remote station, at a decision block 510 it is determined if the remote station is within existing communication range of the second network. If so, the routine 500 continues at the block 518 with the communication controller causing additional information to be transmitted from the remote station over the second network. If not, the routine 500 continues at a block 512 with a service provider dispatching a mobile access point to or toward the location of the remote station. At a block 514, the mobile access point travels toward the location of the remote station. At a decision block 516 it is determined if the mobile access point is in communication range of the remote station. If not, the routine 500 loops to the block 514 and the wireless access point continues traveling to the remote station location. If so, at the block 518 the communication controller causes additional information to be transmitted between the remote station over the second network.

At a block 520, additional information is received from the remote station. At a decision block 522, it is determined if all information desired from the remote station has been received. If not, the routine 500 loops to the block 520 for additional information to be received from the remote station. If so, the routine 500 continues at the block 524 where the objective of the original transmission initiated at the block 504 is resolved. Resolution can occur with the transmission of corrective data or the dispatch and arrival of appropriate assistance. Alternatively, resolution may occur solely from added coverage and/or bandwidth of the second network being implemented to facilitate additional communication. The routine 500 ends at a block 526. It will be appreciated that the routine 500 repeats as often as desired upon events arising at a remote station that may make extension of the second network desirable through deployment of the wireless access point.

Using embodiments of the present invention, resources can be sought from the second network directly without making a determination as to the need for requesting such resources. Seeking resources from the second communication network could be made automatically or as a default upon the remote station having to make a transmission or having to make a transmission of a certain nature.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A system for facilitating communication between a remote station and at least one target, the system comprising:
   a first communicator associated with the remote station and configured to communicate over a first communication network;
   a second communicator associated with the remote station and configured to communicate over a second communication network;
   a GPS unit associated with the remote station and configured to generate GPS data;
   at least one communication controller associated with the remote station and coupled with the first communicator and the second communicator, the communication controller operable to transmit a first set of signals and the generated GPS data using the first communicator and operable to transmit a second set of signals using the second communicator; and
   a mobile network access point,
   wherein the remote station is sent travel instructions based on the generated GPS data over the first communication network via the first communicator directing remote station to travel to a first location and the mobile network access point is sent travel instructions directing the mobile network access point to a second location such that when the remote station is located at the first location, the second communicator associated with the remote station is in range of the mobile network access point at the second location.

2. The system of claim 1, further including a communication controller configured to be coupled with at least one of the first communicator and the second communicator for receiving inputs concerning a status of the remote station and reporting that status using at least one of the first communicator and the second communicator.

3. The system of claim 2, wherein the communication controller is configured to be coupled with sensing equipment for gathering information about the status of the remote station.

4. The system of claim 3, wherein the sensing equipment includes at least one of a telephone interface configured to provide audio communication with a remote station operator, a monitoring device for generating telemetry reflecting conditions at the remote station, and an alert key for signaling an emergency situation at the remote station.

5. The system of claim 4, wherein the first set of signals includes at least one of a location of the remote station, a request for communication with the second communication network, and an event code signifying a condition at the remote station for which transmitting the second set of signals is desired.

6. The system of claim 4, wherein the second set of signals includes the telemetry reflecting the conditions at the remote station.

7. A system for facilitating communication between a remote station and a service network, the system comprising:
- a first communicator associated with the remote station and configured to communicate over a first communication network;
- a second communicator associated with the remote station and configured to communicate over a second communication network;
- at least one communication controller associated with the remote station and coupled with the first communicator and the second communicator, the communication controller being operable to transmit basic telemetry to the service network using the first communicator and operable to transmit detailed telemetry to the service network using the second communicator; and
- a mobile network access point directable to within a communication range of the second communicator of the remote station when it is necessary for the second communicator to transmit the detailed telemetry to the service network and the second communication network is outside of the communication range of the second communicator of the remote station,
- wherein the remote station is sent travel instructions over the first communication network via the first communicator directing the remote station to travel to a first location and the mobile network access point is sent travel instructions directing the mobile network access point to a second location such that when the remote station is located at the first location, the remote station is in range of the mobile network access point at the second location.

8. The system of claim 7, further including a communication controller configured to be coupled with at least one of the first communicator and the second communicator for receiving inputs concerning a status of the remote station and reporting that status using at least one of the first communicator and the second communicator.

9. The system of claim 8, wherein the communication controller is configured to be coupled with sensing equipment for gathering information about the status of the remote station.

10. The system of claim 9, wherein the sensing equipment includes at least one of a telephone interface configured to provide audio communication with a remote station operator, a global positioning system for determining a geographical position of the remote station, a monitoring device for generating telemetry reflecting conditions at the remote station, and an alert key for signaling an emergency situation at the remote station.

11. The system of claim 10, wherein the basic telemetry includes at least one of a location of the remote station, a request for communication with the second communication network, and an event code signifying a condition at the remote station for which transmitting the detailed telemetry is desired.

12. A method for facilitating communication between a remote station and at least one target, the method comprising:
- enabling communication of a first set of signals from the remote station over a first communication network;
- enabling communication of a second set of signals from the remote station over a second communication network;
- requesting communication resources at the remote station from the second network in the first set of signals;
- transmitting travel instructions over the first communication network that directs the remote station to travel to a first location
- dispatching a mobile network access point to a second location within communication range of the remote station at the first location such that the second set of signals can be transmitted over the second communication network.

13. The method of claim 12, further including receiving information concerning a status of the remote station and reporting the status through at least one of the first set of signals and the second set of signals.

14. The method of claim 12, further including gathering information about the status of the remote station.

15. The method of claim 14, wherein information about the status of the remote station is gathered using at least one of telephone interface configured to provide audio communication with a remote station operator, a global positioning system for determining a geographical position of the remote station, a monitoring device for generating telemetry reflecting conditions at the remote station, and an alert key for signaling an emergency situation at the remote station.

16. The method of claim 15, wherein the first set of signals includes at least one of a location of the remote station, a request for communication with the second communication network, and an event code signifying a condition at the remote station for which transmitting the second set of signals is desired.

17. The method of claim 15, wherein the second set of signals includes the telemetry reflecting the conditions at the remote station.

18. A method for facilitating communication between a remote station and at least one target, the method comprising:
- enabling communication of basic telemetry from the remote station over a first communication network;
- enabling communication of detailed telemetry from the remote station over a second communication network;
- requesting communication resources at the remote station from the second communication network in the basic telemetry to allow for communication of detailed telemetry to the service network over the second communication network;
- transmitting travel instructions over the first communication network that directs the remote station to travel to a first location; and
- dispatching a mobile network access point to a second location within communication range of the remote station for the communication of the detailed telemetry to the service network over the second communication network when the remote station is located at the first location.

19. The method of claim 18, further including sending instructions to the remote station directing the remote station how to travel such that the communication range of the remote station can reach at least one of the second communication network or the mobile network access point.

20. The method of claim 18, further including receiving information concerning a status of the remote station and reporting the status over at least one of the first communication network and the second communication network.

* * * * *